United States Patent [19]

Graf et al.

[11] Patent Number: 4,819,467
[45] Date of Patent: Apr. 11, 1989

[54] ADAPTIVE CONTROL SYSTEM FOR HYDRAULIC PRESS BRAKE

[75] Inventors: Raymond J. Graf; Scott D. Tucker, both of Cincinnati, Ohio

[73] Assignee: Cincinnati Incorporated, Cincinnati, Ohio

[21] Appl. No.: 911,915

[22] Filed: Sep. 17, 1986

[51] Int. Cl.[4] .......................................... G06F 15/46
[52] U.S. Cl. .......................................... 72/8; 72/19; 72/21; 72/389; 72/702; 364/476; 364/474.07
[58] Field of Search ................... 72/21, 8, 19, 453.01, 72/702, 389; 364/474, 476, 475, 472

[56] References Cited

U.S. PATENT DOCUMENTS

| | | |
|---|---|---|
| 3,564,883 | 2/1971 | Koors et al. ................. 72/8 |
| 4,148,203 | 4/1979 | Farazandeh et al. ............. 72/21 |
| 4,408,471 | 10/1983 | Gossard et al. ................ 72/21 |
| 4,486,841 | 12/1984 | Koyama et al. ................. 72/21 |
| 4,510,570 | 4/1985 | Yonekura ..................... 72/21 |
| 4,511,976 | 4/1985 | Graf .......................... 72/21 |
| 4,550,586 | 11/1985 | Aubert et al. ................. 72/21 |
| 4,640,113 | 2/1987 | Dieperink et al. .............. 72/21 |

Primary Examiner—David Jones
Attorney, Agent, or Firm—Frost & Jacobs

[57] ABSTRACT

A computer-based control for a press brake of the type having a ram for bending a sheet metal workpiece to a desired bend angle. The control incorporates a teach mode which collects ram force and position data during the bending of one or more test workpieces and calculates from the force and position data parameters representative of the ram reversal position necessary to produce the desired bend angle. The control also incorporates a bend mode for bending a production workpiece to the desired bend angle wherein force and position data is collected during the bending of the production workpiece and is used in conjunction with the parameters calculated during the bending of the test workpieces during the teach mode to calculate the exact position of ram reversal necessary to produce the desired bend angle in the production workpiece. The control also incorporates correction of the position of ram reversal to account for ram overshoot during the bend mode.

15 Claims, 12 Drawing Sheets

ADAPTIVE CONTROL SYSTEM FOR HYDRAULIC PRESS BRAKE

SUMMARY OF THE INVENTION

The present invention is directed to a control system for press brakes, and more particularly to a control system for use with hydraulic press brakes to predict the exact point of ram reversal necessary to produce a desired bend angle in a sheet-like workpiece based upon in-process measurements made during the forming or bending cycle.

A common problem which occurs with conventional press brakes used to bend sheet metal or the like to a predetermined angle is the return or springback of the material to a position somewhat less than the desired bend upon retraction of the punch member from the die. Generally, the terminal punch position is selected manually by an operator so that the stroke of the ram is reversed at a predetermined point to produce the desired angle of bend. Consequently, the selection of the reversal point by the operator is an artful choice to ensure that the metal sheet is overbent just enough to spring back to the desired angle. This procedure is usually based on trial and error coupled with the experience of the press brake operator.

The proper point for ram reversal for a particular bend angle depends upon the properties of the material being bent, the geometry of the die and punch, and the specific angle desired. This point is often found by making several trial bends to empirically determine the reversal point producing the best bend angle including compensation for springback. However, it has been found that once this point is determined, it will vary from bend to bend as the material varies in thickness and physical properties.

FIG. 1 illustrates schematically the geometry associated with a typical press brake punch P and a V die D having an opening width VW. In a typical bending operation, a flat metalic workpiece W, having a thickness T and illustrated in the relaxed or unbent state in FIG. 1, is placed on the upper surface of V die D. Although for purposes of an exemplary showing the present invention is described and illustrated in connection with a press brake having a downwardly movable punch, it will be understood it may also be used with any type of forming machine.

As punch P is moved downwardly, it enters the V-shaped channel of V die D, bending workpiece W to a particular angle, as illustrated in FIG. 2.

At the furthest downward extent of travel of punch P, workpiece W will be bent to a loaded angle $\theta_1$ somewhat greater than the desired flank angle. As the direction of travel of punch P is reversed, workpiece W returns or springsback to a slightly smaller angle, and when fully unloaded, assumes an unloaded flank angle designated $\theta_u$. The amount of springback associated with workpiece W will depend upon the particular characteristics and size of the material used, as well as the parameters of the punch and die. Consequently, it will be observed that a certain degree of downward overtravel of punch P is usually necessary to produce a particular desired unloaded flank angle $\theta_u$.

FIG. 3 illustrates graphically the loading and unloading characteristics of the workpiece W, where ram force is plotted as a function of bend or flank angle. The initial linear elastic region of the curve designated a represents elastic bending of workpiece W. If at any point during this portion of the curve, the direction of travel of punch P is reversed, workpiece W will return to its original unbent state.

As the bend or flank angle $\theta$ is increased still further beyond the elastic portion of the curve depicted in FIG. 3, the plastic region is entered, where the workpiece will retain a permanent bent shape upon retraction of punch P. This region continues until the point of ram reversal occurring at the loaded flank angle $\theta_1$.

As the direction of travel of punch P is reversed at the ram reversal point, the workpiece will relax along the elastic unloading portion of the curve shown in FIG. 3, eventually springing back to a relaxed or unloaded flank angle $\theta_u$. Consequently, the difference between the loaded and unloaded flank angles (i.e., $\theta_1 - \theta_u$) is the amount of springback of the material. Consequently, in order to produce a workpiece having a final desired flank angle $\theta_u$, the workpiece must be overbent to the loaded flank angle $\theta_1$.

There have been previous methods for automatically calculating the point of ram reversal to produce a desired bend angle in a workpiece based on in-process measurements. For example, in U.S. Pat. No. 4,408,471 issued Oct. 11, 1983 and entitled "Press Brake Having Spring-Back Compensating Adaptive Control", the point of ram reversal is calculated based on the bending moment of the workpiece. The model associated with this method utilizes the calculation of the "wrap around" characteristics associated with the cooperation between the workpiece and the punch/die.

Another method is illustrated in U.S. Pat. No. 4,511,976 issued Apr. 16, 1985 and entitled "Press Brake Having Springback Compensation Stroke Reversal Control". This method utilizes a sensor making mechanical contact with the workpiece for monitoring the actual bend angle of the workpiece to provide determination of the theoretical ram reversal point based on the calculated intersection of the plastic portion of the loading curve and the elastic unloading curve. This point corresponded to the calculated loaded flank angle which will produce the desired unloaded flank angle.

The present invention describes an electronic computer-based control system associated with the press brake which senses the position of the ram and the force applied to the workpiece, in order to calculate the precise point of ram reversal to accurately produce a desired bend angle in the workpiece with a single ram stroke. Since the control system is adaptive, based on working parameters of the press brake encountered during the forming process, trial and error procedures for establishing the required point of ram reversal during production work are eliminated thereby reducing machine set-up time.

In a preferred embodiment, the adaptive control system of the present invention includes position encoders (one at each end) for sensing the position of the ram to produce a digital ram position signal. Load transducers in the form of load cells associated with both of the ram hydraulic pistons and cylinders produce a load signal representative of the instantaneous force supplied to the workpiece. Strain gauges mounted to the housings may also be used for this purpose. Using this information, as well as fixed input data relating to the die and brake structure and the particular workpiece material, the processor (which may be a digital computer) calculates the precise point of ram reversal position necessary to produce a bend having a particular relaxed bend angle.

When the ram reaches the calculated point, the direction of movement of the ram is reversed to bring the punch out of contact with the workpiece. Subsequent bends may be made in a similar manner without additional manual set-up of the brake.

Further features of the invention will become apparent from the detailed description which follows.

DETAILED DESCRIPTION

Figure 1:
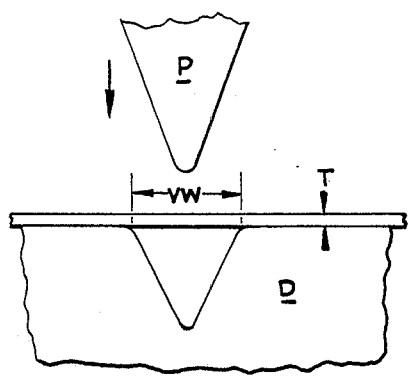
FIG. 1 is a fragmentary enlarged end view illustrating the relative positions of the punch and die immediately before, the punch contacts the workpiece.
Figure 2:
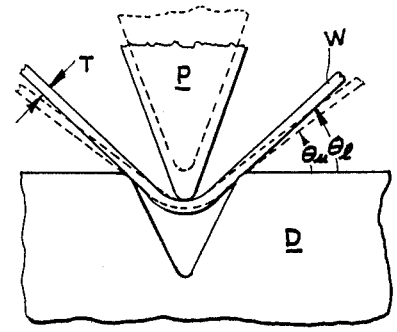
FIG. 2 is a fragmentary enlarged end view illustrating the relative positions of the punch and die during the forming process, with the workpiece illustrated in an alternative relaxed position shown in dashed lines.
Figure 3:
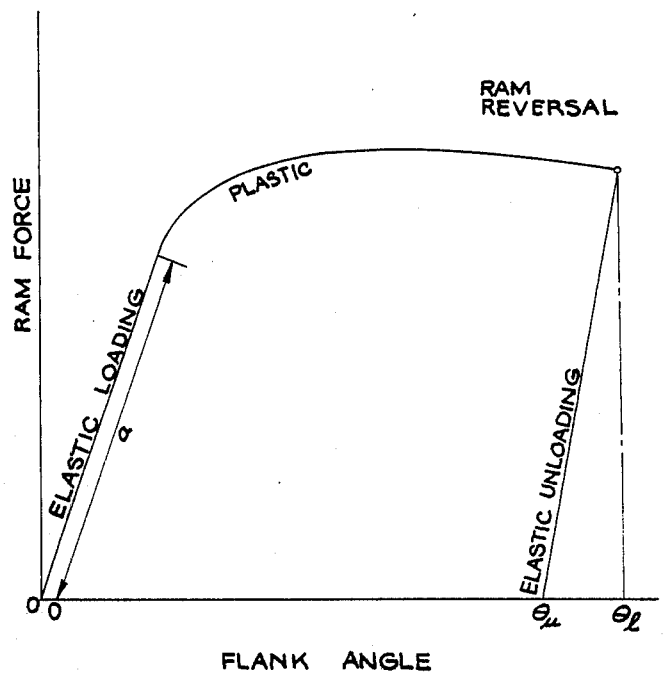
FIG. 3 is a graphical representation of the ram force/flank angle characteristic curve for a typical workpiece.
Figure 4:
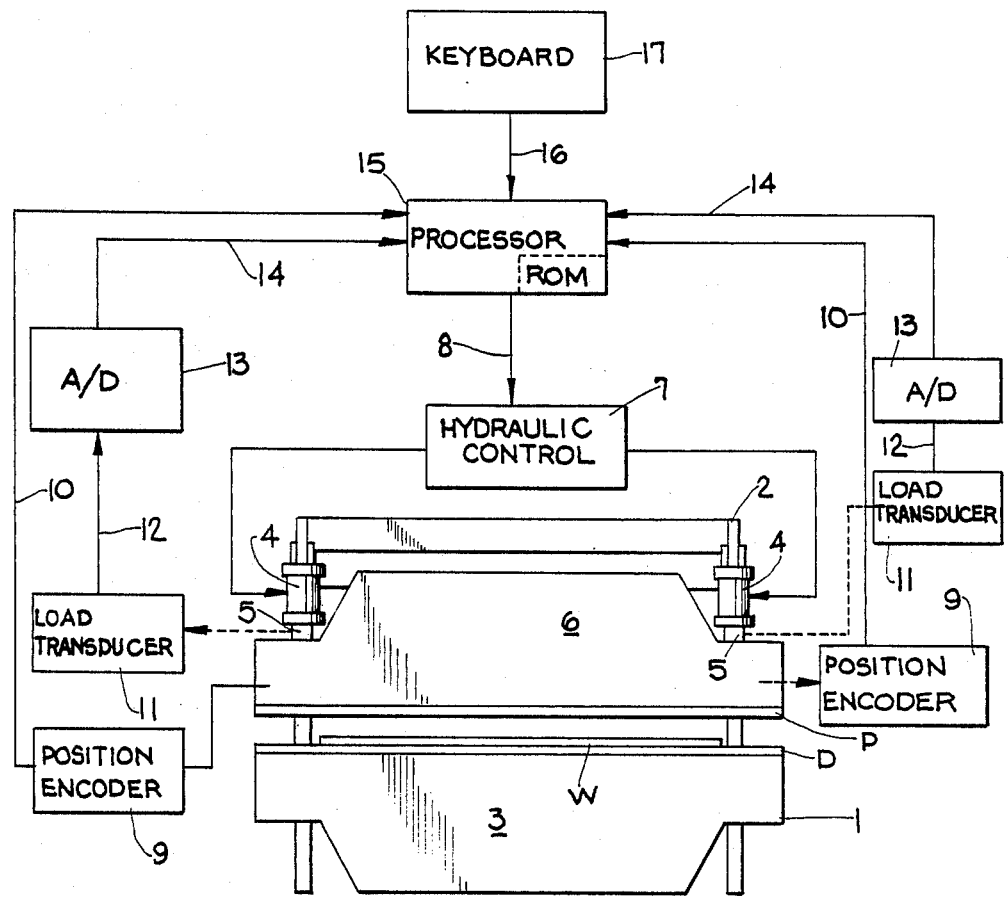
FIG. 4 is a simplified block diagram illustrating the adaptive control system of the present invention in combination with a typical hydraulically operated press brake.

FIG. 4 illustrates in generalized block diagram form the control system of the present invention for controlling a conventional two cylinder hydraulic press brake illustrated generally at 1. Although for purposes of an exemplary showing, the present invention is described and illustrated in connection with such a hydraulic press brake, it will be understood that the system may be used with suitable modification with any type of press brake.

As is well known in the art, brake 1 includes a rigid structural frame 2 fixedly mounting a first forming member comprising a lower bed 3 which supports on its upper surface a horizontally oriented V die D of suitable configuration for forming the workpiece W to a desired shape.

Frame 2 also mounts a pair of vertically oriented hydraulically operated cylinders 4. Each of hydraulic cylinders 4 has associated therewith a vertically reciprocable piston 5, the lower end of which is fixedly attached to one end of a second forming member or ram member 6. The lowermost edge of ram member 6 mounts a horizontally oriented punch P figured to cooperate with V die D to produce the desired bend geometry in workpiece W as described hereinabove.

The flow of hydraulic fluid to and from each cylinder 4 is controlled by means of a conventional hydraulic control 7 in response to an electrical control signal on line 8.

As is well known in the art, by application of an appropriate electrical signal on line 8 to hydraulic control 7, hydraulic fluid may be caused to enter the upper end of cylinders 4, thereby moving pistons 5 and the associated ram member 6 downwardly so that punch P engages workpiece W during the forming or bending stroke. After the bending operation has been completed, application of the appropriate electrical control signal on line 8 to hydraulic control 7 will cause hydraulic fluid to enter the lower end of cylinders 4, thereby moving ram member 6 upwardly so that punch P withdraws from the workpiece, thus completing the bending operation.

In order to ascertain the absolute vertical position of each end of ram member 6 with respect to bed member 3, and therefore the vertical position of punch P, each end of the machine is provided with a conventional digital position encoder 9. Generally, these encoders are mounted outside of the housings such that the encoder scales are mounted on the ram and the read heads on the bed, thus enabling the encoders to read the relative vertical position between bed and ram. Position encoders 9 produce a digital pulse on position encoder output lines 10 for each incremental distance traveled by ram member 6. Alternatively, the output on lines 10 may be digital signals representative of the absolute position of ram member 6.

Conventional load transducers 11 are associated with both of pistons 5 and produce electrical signals on lines 12 proportional to the force being exerted by the punch P against workpiece W. For example, load transducers 11 may comprise conventional load cells formed from a piece of steel having strain gauges arranged at the end of pistons 5 or on housings 2 to form a conventional bridge circuit as described in U.S. Pat. No. 3,564,883 entitled "Hydraulic Press Control", issued Feb. 23, 1971 to C. W. Koors et al.

The electrical load transducers output signals appearing on line 12 are converted to digital signals by analogue to digital converters 13. The output signals from analogue to digital converters (A/D) 13 are applied on lines 14 to processor 15. It will be understood that processor 15 may be a general purpose digital computer, a special purpose digital computer, or a microprocessor. As well known in the art, processor 15 implemented as a computer will include read only memory (ROM).

Using the position and force data received from position encoders 9 and load transducers 11, respectively, processor 15 operates as will be described in more detail hereinafter to produce an output signal on line 8 to cause hydraulic control 7 to reverse the direction of travel of ram 6 at the precise point of punch penetration to produce the desired bend angle.

A flow diagram for the control program used with processor 15 in the adaptive control of the present invention is illustrated in FIGS. 5A-5C, 6A-6D, and 7A-7B. As is well known in the computer processing art, the control program illustrated by these flow diagrams may be implemented as hardware or firmware in the ROM associated with processor 15.

Suitable input control signals and commands may be inputted to processor 15 on line 16 from a conventional keyboard 17 or other well known input means such as switches or the like.

Figure 5A:
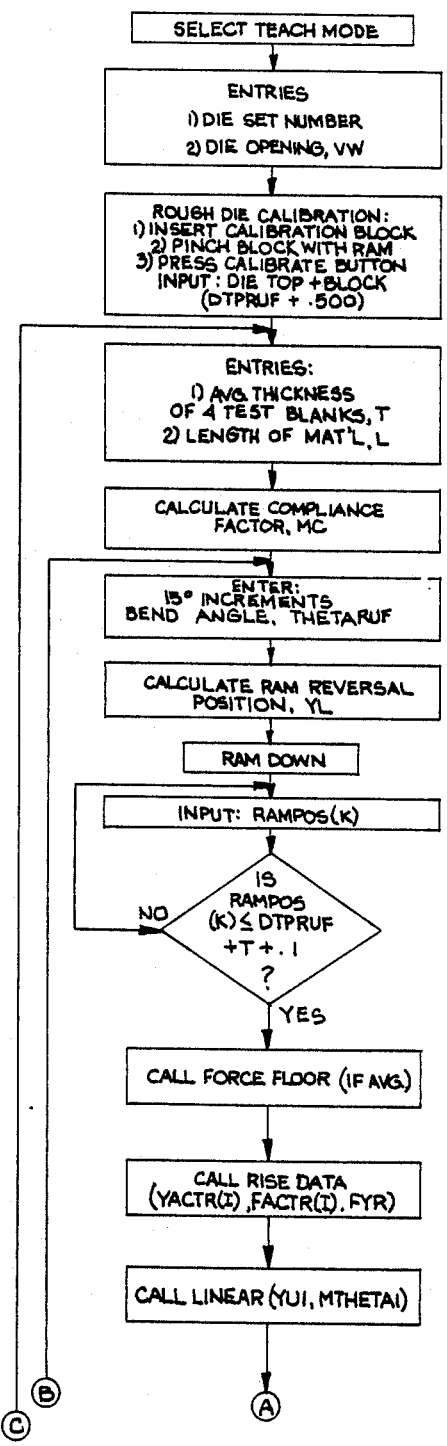
FIG. 5A-FIG. 5C is a flow diagram for the select teach mode section of the control program of the processor used in the adaptive control of the present invention.
Figure 5B:
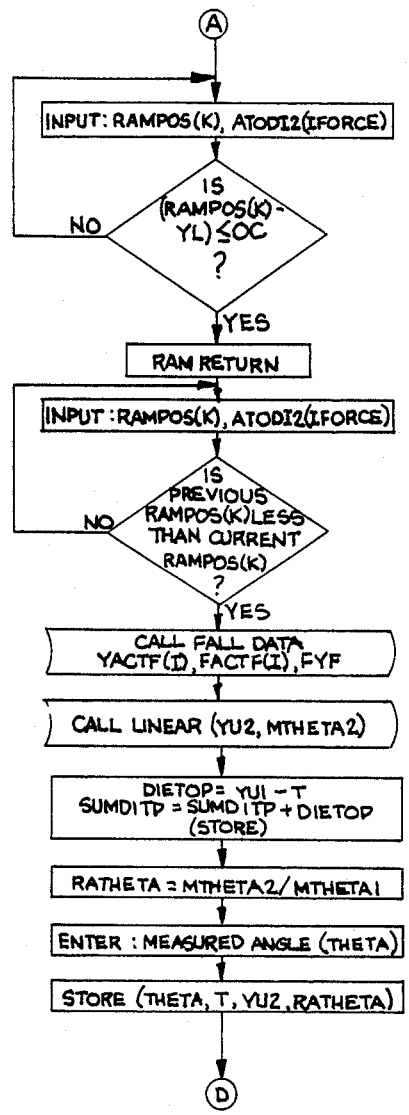
Figure 5C:
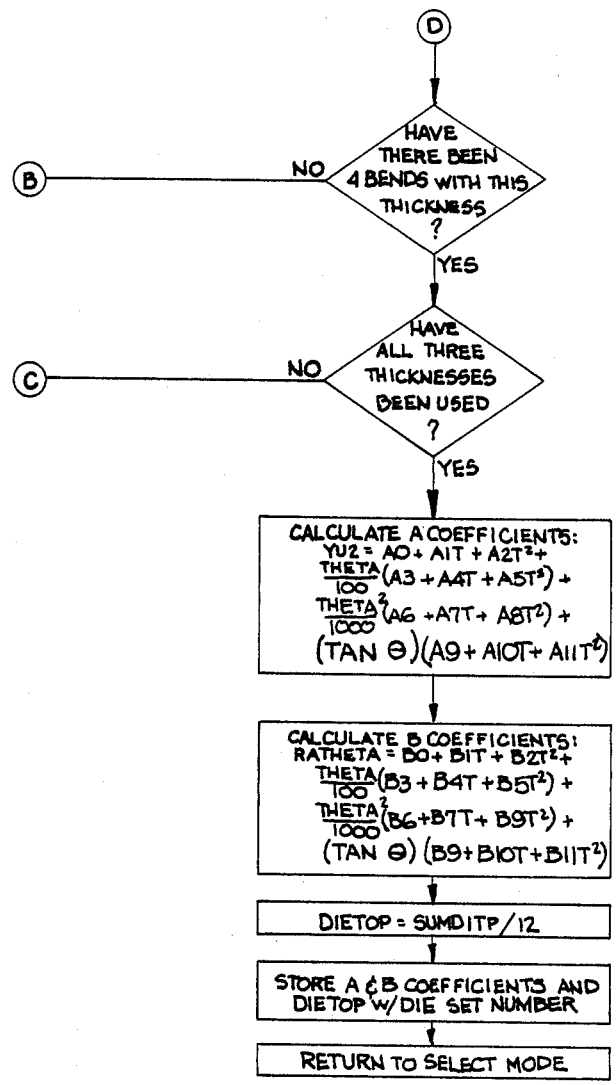

FIG. 5A-FIG. 5C illustrate the processing for the Teach mode of operation of the present invention. In this mode, certain parameters representative of the bending characteristics of a class of workpieces are calculated based upon in-process measurements taken during the forming operation of a limited number of sample representative workpieces or multiple bends on the same sample workpiece. That is, by measuring the force/distance characteristics associated with a limited number of workpieces, the control system "learns" the appropriate point for reversing the direction of travel of the ram at the proper point in order to produce desired bend angles with workpieces having similar characteristics.

Referring first to FIG. 5A, the operator enters data identifying the particular die set, as well as the dimension of the die opening, VW. This information is used by the system to be certain that the appropriate operating parameters are chosen associated with the particular die set being used.

Next, a calibration die block is positioned on the upper surface of V die D, and the ram lowered until the punch P just touches the die block. For the particular example given, the die block is exactly 0.500 inches thick. Thus, using the position information derived from position encoder 9, processor 15 stores the approximate vertical position associated with the top of die D, i.e., DTPRUF. This information is stored in the processor memory for later use.

During the first pass through the processing, four workpiece test blanks, all of the same nominal or average thickness T, will each be bent to a different desired angle. On successive passes through the processing, test blank workpieces having different thicknesses will be used.

The operator next enters the average or nominal thickness T of the initial run of four test blanks, as well as the length of the material. This information is stored to accurately calibrate the system, and is used in subsequent calculations.

The processor then calculates the compliance factor MC for the particular machine using any conventional method using previously stored information from previous bends and the bend length data supplied by the operator. Alternately, the compliance factor may be manually calculated and entered by the operator. As is well known in the art, the compliance will be constant for a given machine or machine design, varying only with length of the load which is known, inasmuch as the length of the test blanks has been entered as a calibration parameter. The compliance factor is used to correct ram position readings, for bed and ram deflections.

The operator then enters four desired bend angles for the test blanks. Generally, the range of bend angles used will cover the expected range of bend angles likely to be encountered during actual operation on production workpieces. For example, if the expected range of bend angles is 0°-60°, each of the four test blanks will be formed to a different bend angle covering this range, e.g., in 15° increments, such as 15°, 30°, 45°, and 60°. This information is entered as a rough measurement of the desired bend angle, THETARUF.

Figure 9:
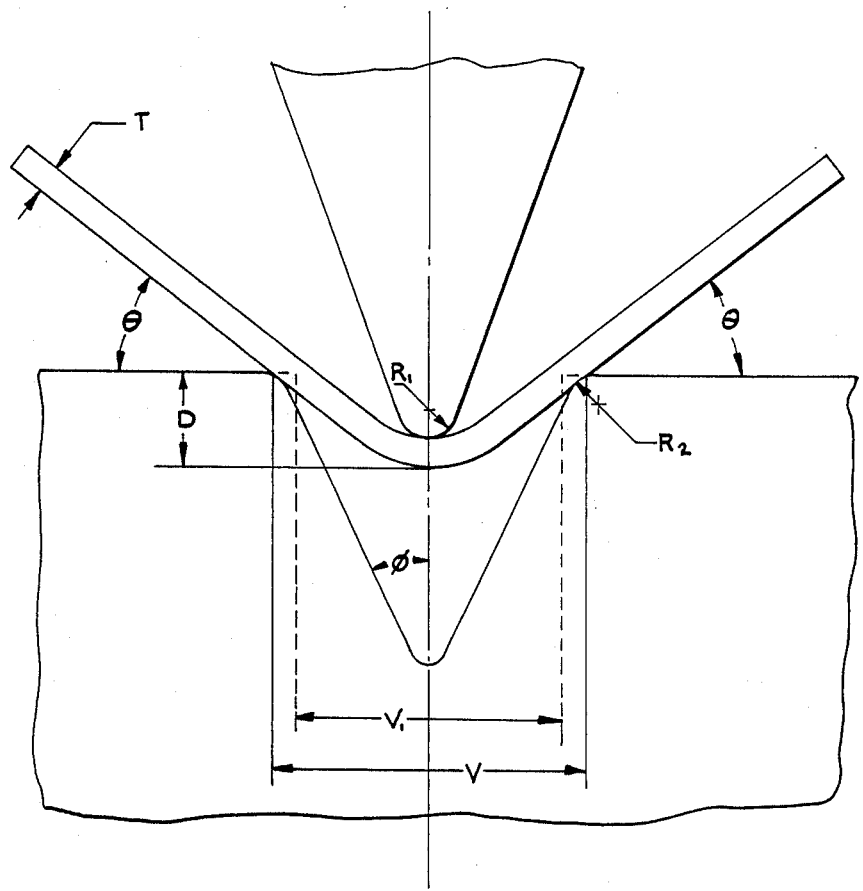
FIG. 9 is an enlarged fragmentary diagrammatic end view showing the geometry associated with the forming of a typical workpiece.

The control then calculates a rough value for the point of ram reversal $Y_L$ (i.e., the ram position associated with the loaded flank angle $\theta_1$) in order to determine the point at which the ram direction should be reversed to produce the desired unloaded bend angle, THETARUF. This rough ram reversal point $Y_L$ is calculated using trigonometric relationships of a simple assumed approximate bend shape as illustrated in FIG. 9 using the relationship:

$$V_1 = V - \left[\left(R_2 - \frac{R_2}{\cos\phi} - R_2 \tan\phi\right)(2)\right]$$

$$D = [R_2(1 - \cos\Theta)] + [(R_1 + T)(1 - \cos\Theta)] + [V_1 + R_2 - ((\sin\Theta)(R_2 + R_1 + T))][\tan\Theta]$$

where
$V_1$ = width of the die opening assuming a squared-off upper edge
$V$ = actual die opening width
$R_2$ = die edge radius
$\phi$ = one-half die opening angle
$D$ = punch depth of penetration at ram reversal
$\theta$ = actual flank angle
$T$ = material thickness
$R_1$ = punch radius From the calculated depth of penetration D, the desired ram reversal point can be determined.

A control signal from processor 15 is then applied on line 8 to hydraulic control 7, and causes ram 6 to begin downward movement. At a plurality of vertical positions, the actual vertical position of ram 6 as sensed by position encoders 9 is determined, and stored in memory in processor 15. However, it should be noted that position information is not stored in processor 15, until the punch is closely adjacent the workpiece to conserve memory space. This is determined by the test block in FIG. 5A which determines whether the actual ram position (RAMPOS(K)) is less than or equal to the position of the top of the V die D (DTPRUF), plus the thickness of the workpiece, T, plus an arbitrary small distance of 0.1 inch. As long as this condition is not satisfied, the processing continues to loop.

Figure 6C:
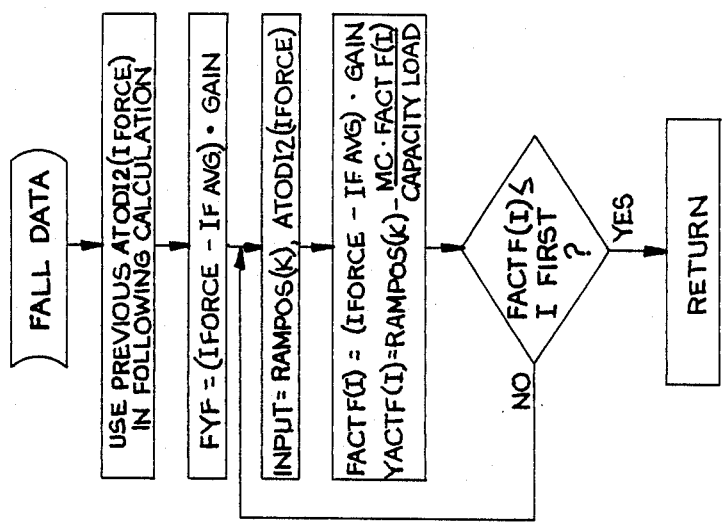
FIG. 6A-FIG. 6D is a flow diagram for the subroutines of the control program of the processor used in the adaptive control of the present invention.
Figure 6A:
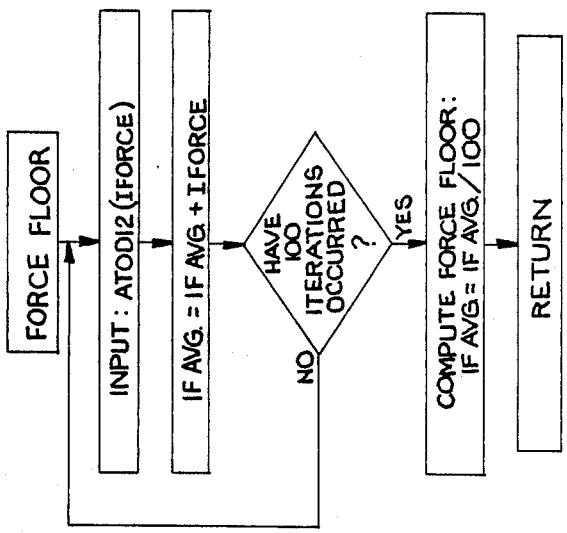

When the aforementioned condition is satisfied, indicating that the bottom of the punch P is closely adjacent the upper surface of workpiece W, the system branchs to the Force Floor subroutine illustrated in FIG. 6A. This subroutine is necessary to calibrate load transducers 11 to compensate for weight of ram 6 and associated tooling, friction, etc.

Figure 8:
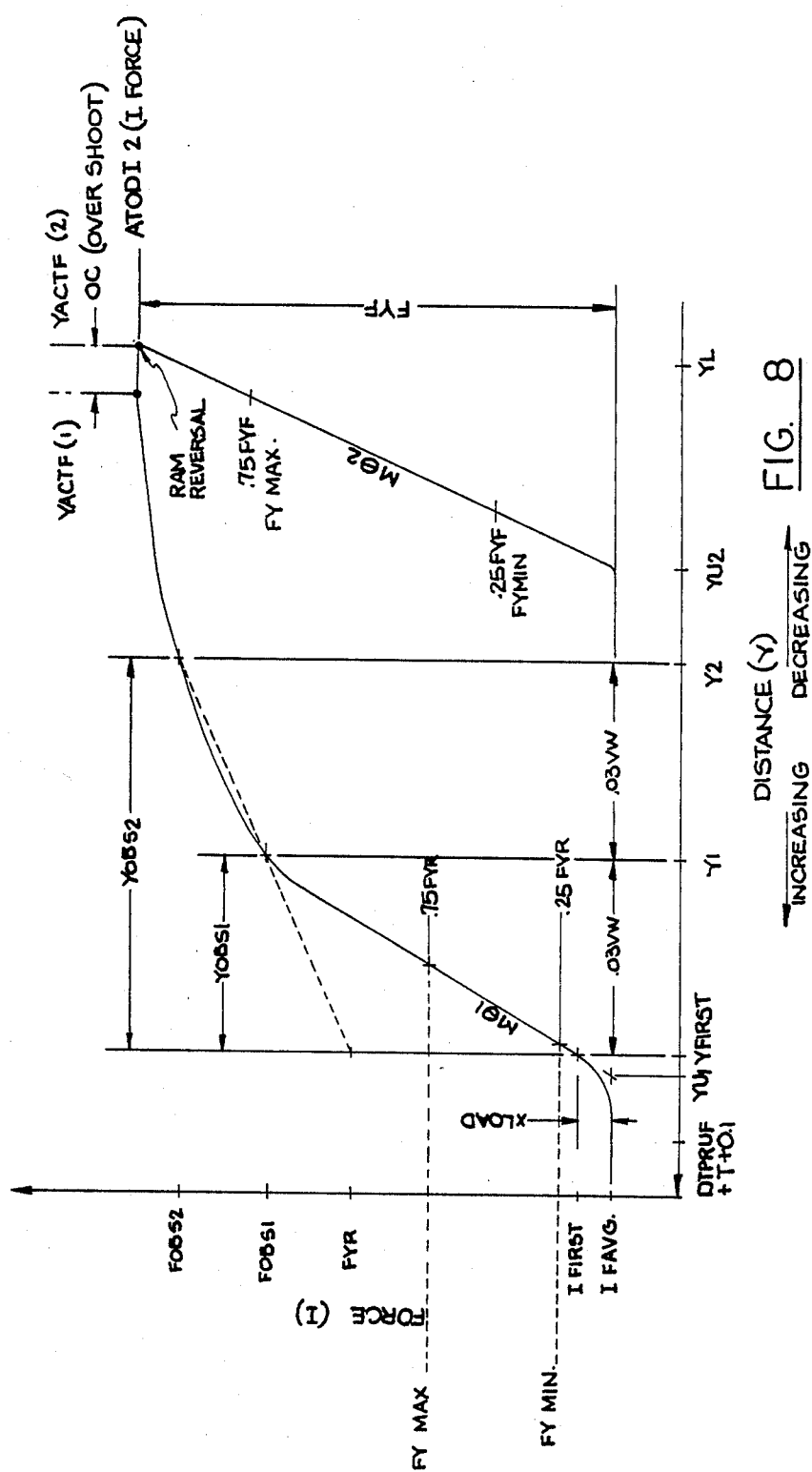
FIG. 8 is a graphical representation of the ram force/punch distance characteristic curve for typical workpiece utilizing the present invention.

The Force Floor subroutine calculates the average force output from load transducer 11 during the small amount of ram travel immediately before punch P contacts the upper surface of workpiece W. That is, 100 measurements of force (IFORCE) are taken, and averaged to compute the "force floor" value IFAVG. As can be seen in FIG. 8, which is a plot of the force measured by load transducers 11 as a function of decreasing distance between punch P and the upper surface of V die D, the value IFAVG provides a minimum force floor to which all subsequent force measurements are referenced.

Figure 6B:
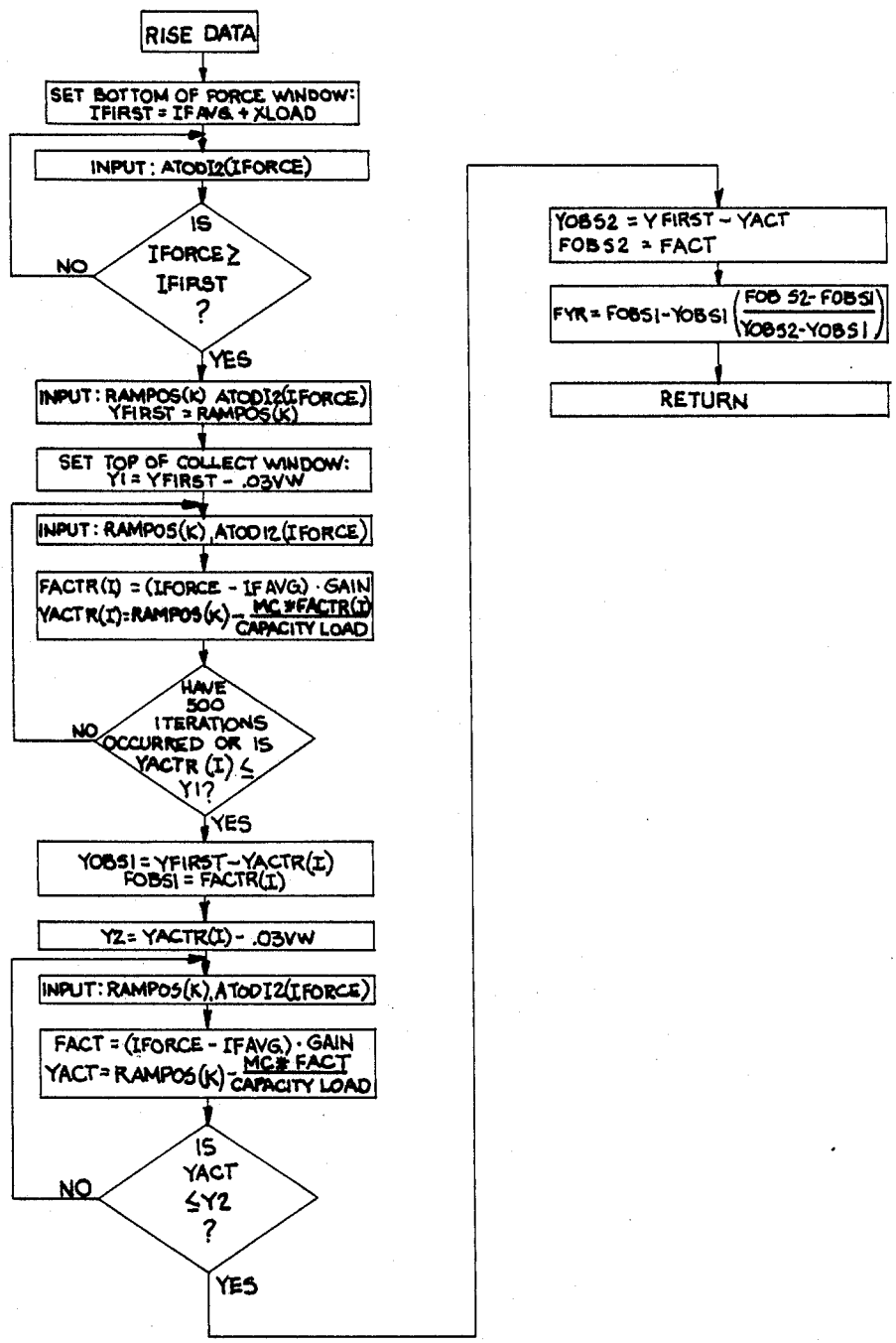

Upon return of the Force Floor subroutine to the main processing of FIG. 5A, the processing branchs to the Rise Data subroutine, the processing of which is represented by the flow diagram of FIG. 6B. This subroutine is intended to calculate the characteristic parameters for the loading elastic region of workpiece bending.

The Rise Data subroutine begins collecting load force data values ATODI2 (IFORCE) and associated data values (RAMPOS(K)), and sets the bottom of the force window in order to eliminate data associated with the lower "knee" of the workpiece force/distance curve. This is accomplished by adding a small fixed force XLOAD to the force floor value IFAVG to determine the first force/distance data pair IFIRST/YFIRST. It will be noted that data is not stored until the actual force measured (IFORCE) is greater than IFIRST. When this condition is met, the first data pair is stored in memory.

The upper limit of the data collection region for the loading portion of the force/distance curve occurs when the ram has descended a distance of about 3% of the width of the V die (0.03 VW) below the first force data point (IFIRST), corresponding to the value Y1.

After this calculation has been made, the force exerted by the ram (IFORCE) as determined by load transducers 11 is stored at each incremental position of the ram (RAMPOS(K)) as determined by position encoders 9.

The actual force (FACTR(I)) is then calculated by the relationship FACTR(I)=(IFORCE−IFAVG) * GAIN, where GAIN is an amplification factor.

Similarly, the actual ram position (YACTR(I)) is calculated by the relationship $$YACTR(I) = RAMPOS(K) - \frac{MC * FACTR(I)}{CAPACITY\ LOAD}$$

where CAPACITY LOAD is the maximum capacity load of the press brake being used and MC is the compliance factor calculated as described hereinabove.

A test is then made to determine whether the ram has reached position Y1. If this condition is met, the distance between YFIRST and the last ram position reading is calculated as YOBS1, and the last force reading taken (FOBS1). Both values are stored.

The processor then determines the parameters associated with the plastic portion of the loading curve by first calculating a value Y2 (see FIG. 8). The processor then accumulates force/distance data between the ram positions Y1 and Y2, and calculates the actual force FACT and ram distance YACT as described hereinabove. This process continues until the actual ram position is less than or equal to the position Y2.

At this point, a value YOBS2 is calculated as the distance between Y2 and YFIRST, and the corresponding force value FOBS2 is determined (see FIG. 8). Both values are stored.

By linear extrapolation, the processor then calculates the force intercept FYR of the linear approximation to the plastic region of the loading curve at the distance value YFIRST. The Rise Data subroutine then returns to the main processing of FIG. 5A, whereupon a branch to the Linear subroutine occurs as described in connection with FIG. 6D.

The purpose of the Linear subroutine is to calculate certain parameters from the force/distance data stored as a result of the loading characteristic of the workpiece which will be used thereafter to calculate the reversal point of the ram.

To ensure that only data is used in the linear part of the elastic portion of the loading curve, limits (FYMIN, FYMAX) are calculated as 25% and 75% respectively, of the previously calculated value FYR (see, FIG. 8). Data in this region is then selected for calculation of the values SX, SY, SXX and SXY to be used in a least squares fit routine for calculating the equation for a straight line representing the elastic region of the loading curve. These values are used, in turn, to calculate the coefficients A0, A1 and A2. The value YU1 is then calculated from the coefficients A0 and A1 as the intercept of the elastic region of the loading curve with the force floor IFAVG. Finally, the slope MTHETA1 ($M\theta 1$) is calculated from the coefficients A1 and A2. The Linear subroutine then returns to the main processing of FIG. 5B.

As the ram continues to move downwardly, force and distance data (RAMPOS(K), ATODI12-(IFORCE)) continue to be read by processor 15. A test is then made to determine whether the actual ram position has reached the assumed rough reversal point YL described hereinabove. In the preferred embodiment described, the test requires that the ram reversal signal be given slightly before the assumed reversal point YL in order to compensate for the actual overshoot of the ram due to valve shift time and inertia represented by an overshoot constant OC. When this test is satisfied, indicating that the ram has reached a distance above the reversal point equal to the overshoot distance OC, a signal is outputted on line 8 from processor 15 to reverse the direction of ram travel to the upward direction.

The force (ATODI12) at the point of ram reversal is stored, and a test is made to determine whether the ram has begun moving upwardly. When this occurs, the processor branches to the Fall Data subroutine illustrated in FIG. 6C.

The purpose of the Fall Data subroutine is to accumulate force/distance data as the workpiece relaxes along the unloading curve in a manner similar to that described hereinabove in connection with the Rise Data subroutine of FIG. 6B.

First, a value FYF is calculated as the force differential between the force measured at the ram reversal point and the force floor IFAVG, multiplied by a suitable gain factor GAIN. As the ram ascends, additional force and distance (RAMPOS(K), ATODI12 (IFORCE)) information is stored in memory by processor 15. The processor then calculates a parameter FACTF(I) which is equal to the actual force, as well as an actual distance value YACTF(I) from the relationship:

$$RAMPOS(K) - \frac{MC * FACTF(I)}{CAPACITY\ LOAD}$$

The Fall Data subroutine returns to the main processing of FIG. 5B when the actual calculated force falls below the previously established IFIRST value.

Figure 6D:
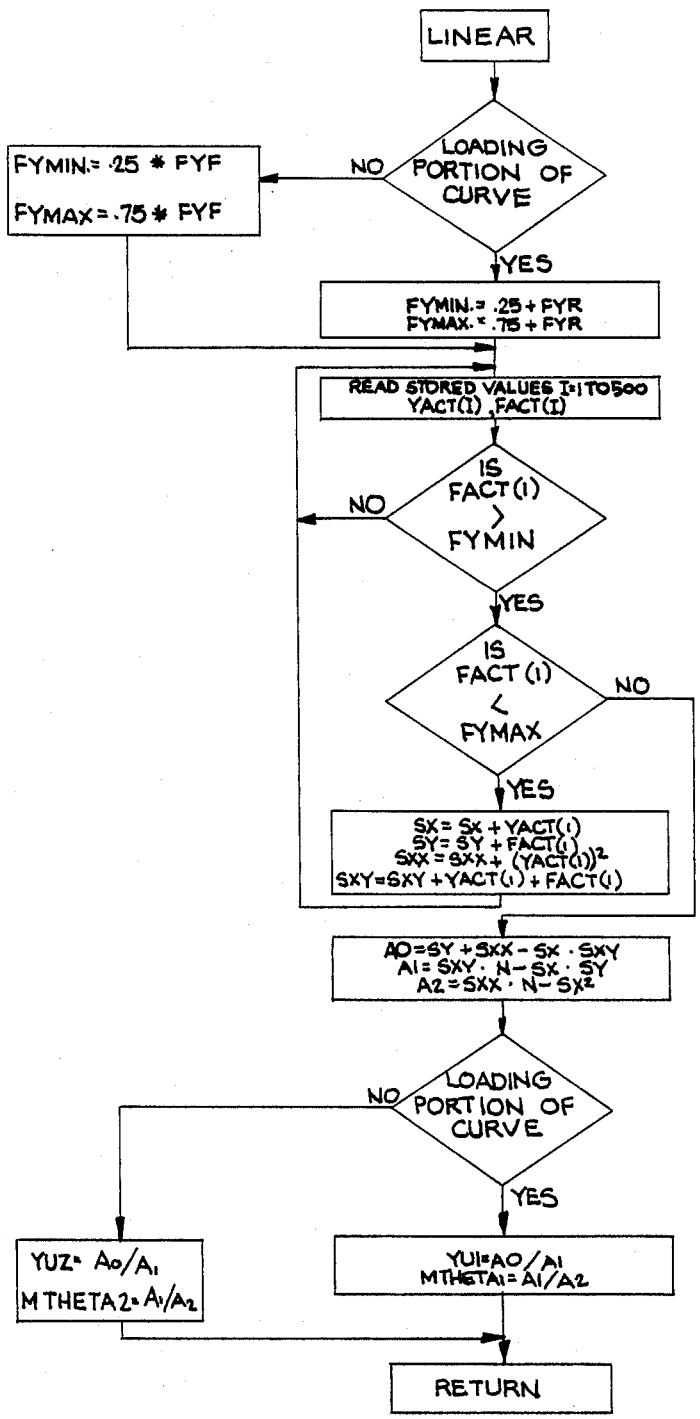

Returning to the main processing of FIG. 5B, the processing then branches once again to the Linear subroutine, previously described as illustrated in FIG. 6D, in order to calculate the slope $M\theta 2$ of the unloading curve and YU2, the intersection of the unloading curve and IFAVG. In the case of data collected during the unloading portion of the workpiece bending operation, the values FYMIN and FYMAX are calculated as 25% and 75%, respectively, of the value FYF in order to segregate data occurring during the linear portion of the unloading curve. As before, the parameters SX, SY, SXX and SXY are calculated to be used in a least squares fit in order to derive the coefficients A0, A1 and A2. These coefficients are used, in turn, to calculate the intercept point YU2 of the unloading curve with the force floor IFAVG, as well as the linearlized slope of the unloading curve MTHETA2 ($M\theta 2$). The Linear subroutine then returns to the main processing of FIG. 5B.

The theoretical actual top of V die D is then calculated by subtracting the thickness T of the workpiece from the ram distance YU1 representing the intersection of the loading curve with force floor IFAVG. It will be observed that the position YU1 represents the theoretical point at which punch P contacts the upper surface of workpiece W. The material thickness T can then be subtracted from the position YU1 to calculate the relative position DIETOP of the upper surface of the die. This theoretical distance corresponding to the upper surface of the die (DIETOP) will be added (SUMDITP) to each of the values of DIETOP calculated for the remaining eleven test blanks, and then averaged to find the upper surface of the die as described in connection with FIG. 5C.

The ratio of the loading and unloading slopes is then calculated to derive the parameter RATHETA. The test workpiece is removed from the press brake and the operator manually measures the actual bend angle produced on the workpiece, and enters this value (THETA) into memory through keyboard 17.

Another test workpiece of the same thickness is then used to form a bend to the next test incremental bend angle, e.g. 30°. This process is repeated, with the noted parameters being calculated for each of the four bend angles for test blank workpieces of the same thickness.

This same procedure is then repeated for each of the other two test workpiece thicknesses.

After all 12 test blanks have been formed (see FIG. 5C), and the data for each accumulated, the processing proceeds to calculate the A coefficients associated with the second order equation:

$$YU2 = A0 + A1T + A2T^2 +$$
$$\frac{THETA}{100}(A3 + A4T + A5T^2) +$$
$$\frac{THETA^2}{1000}(A6 + A7T + A8T^2) +$$
$$(TAN\Theta)(A9 + A10T + A11T^2)$$

Since data has been accumulated for 12 test blanks, and there are 12 coefficients A0-A11, the set of twelve resulting equations can be solved for each of the A coefficients by processor 15 using any conventional method. It will be understood that this form of equation has been chosen so as to produce an acceptable fit of data.

Thereafter, the processor similarly calculates coefficients B0-B11 from the relationships:

$$RATHETA = B0 + B1T + B2T^2 +$$
$$\frac{THETA}{100}(B3 + B4T + B5T^2) +$$
$$\frac{THETA^2}{1000}(B6 + B7T + B8T^2) +$$
$$(TAN\Theta)(B9 + B10T + B11T^2)$$

Again, since 12 sets of data have been accumulated, and there are 12 coefficients, each of the B coefficients can be calculated by any conventional method.

Thereafter, the average or nominal position DIETOP of the upper surface of V die D is determined, and stored together with the A and B coefficients and the die set number. This completes the Teach mode processing, and the system returns to the Select mode.

In the exemplary embodiment just described, twelve test samples were used to make four different bend angles in each of three thicknesses. The data accumulated during the elastic unloading portion of the bending curve was compared to data accumulated during the elastic loading portion of the bending curve in order to calculate the parameter RTHETA.

In an alternate embodiment, each of three test samples is bent sequentially to four increasingly acute bend angles. For example, the first test sample is bent to a 15° angle using the method previously described. The operator then removes the sample from the press brake, measures the actual bend angle, and enters this data as previously described. The same test sample is then returned to the press brake and bent to a larger flank angle, e.g. 30°, again using the method previously described. The actual bend angle is again measured, this data entered, and the process repeated for two increasingly larger flank angles. The entire sequence is then repeated for the remaining two sample thicknesses. Thus, this alternate embodiment can be used to establish the necessary parameters in the Teach Mode, but with fewer test samples.

In some cases, it may be difficult to accumulate data during the elastic unloading portion of the bend curve, particularly if the test sample unloading occurs relatively rapidly and the processor is relatively slow. In this situation, data accumulated during a subsequent elastic loading portion may be substituted for the data from the elastic unloading portion of the same bend angle. This is possible because the elastic loading portion of the bending curve will coincide with the elastic unloading portion of the curve for a given bend angle.

Once the parameters described hereinabove have been stored in memory in processor 15 during the Teach Mode of operation, a subsequent bend may be made automatically to subsequent production workpieces using the Bend Mode processing illustrated in FIG. 7A-FIG. 7B.

After the operator inputs the die set number, the system automatically inputs the A and B coefficients, the exact calculated position of the upper surface of V die D, and the width VW of the die. The operator then enters the nominal thickness, (TNOM), the nominal bend length, and desired bend angle (THETA) of the production workpiece W. The compliance, factor MC is then calculated by the processor 15 as previously described. It will be understood that the compliance factor for a particular machine varies only with the length of bend.

The processor 15 then starts the ram moving downwardly (when the operator depresses the foot switch) until the punch P approaches within a predetermined distance (DIETOP+TNOM+0.1) of the calculated upper surface of the die (DIETOP). At this point, the processor branches to the Force Floor subroutine which calculates the value IFAVG as described hereinabove in connection with the Teach Mode processing.

Thereafter, the Rise Data and the Linear subroutines collect data and calculate the parameters YU1 and MTHETA1, also as described previously.

Figure 7A:
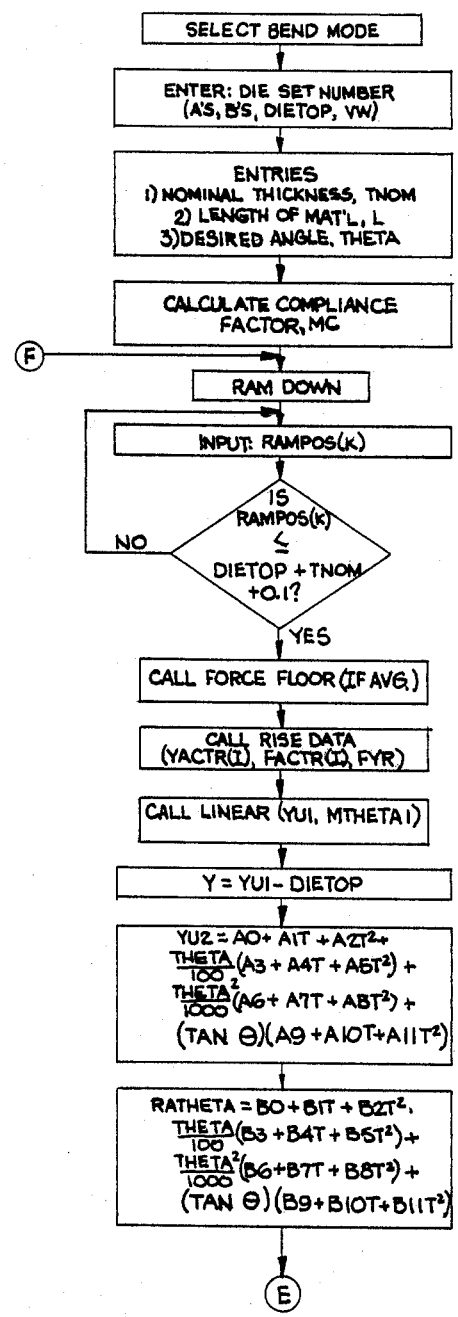
FIG. 7A-FIG. 7B is a flow diagram for the select bend mode portion of the control program of the processor used in the adaptive control of the present invention.

Upon the return from the Linear subroutine to the main processing of FIG. 7A, the processor 15 calculates the exact actual thickness T of the workpiece as the difference between the calculated value, YU1, and the calculated upper surface of the die, DIETOP. Again, it will be observed that the value YU1 is the distance associated with the intercept of the continuation of the elastic portion of the loading curve with the force floor, IFAVG.

Thereafter, the processing proceeds to calculate the unloaded ram position YU2 from the previously stored parameters A0–A11, THETA and the calculated material thickness T.

Similarly, the parameter RATHETA is calculated from the previously stored parameters B0–B11, THETA and T.

Figure 7B:
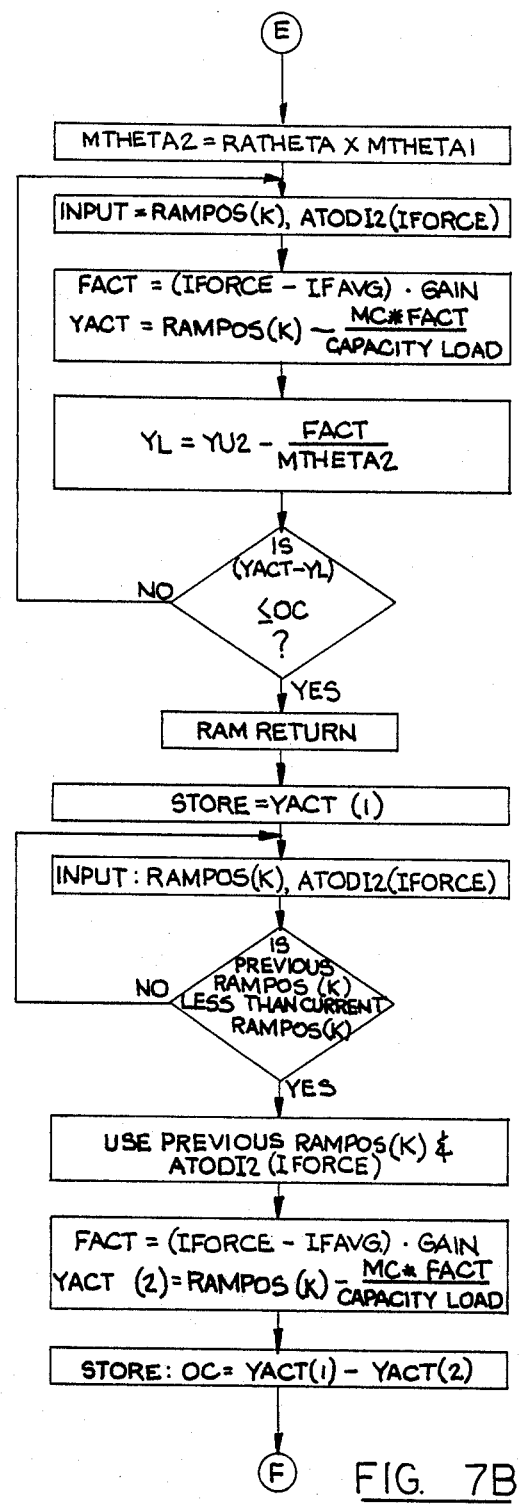

As illustrated in FIG. 7B, the slope of the unloading curve MTHETA2 may then be calculated by the product of RATHETA and MTHETA1 (the slope of the elastic portion of the loading curve).

The position and force information continue to be inputted into processor 15 as the ram bends the workpiece, with the force and distance being corrected to FACT and YACT, respectively, as described previously.

The processing then seeks the intersection of the plastic portion of the loading curve wit the unloading curve, which represents the point YL at which the ram should be reversed. This point of ram reversal can be calculated from the relationship:

$$YL = YU2 - \frac{FACT}{MTHETA2}$$

This value of YL is calculated for each of the actual force measurements. A test is then made to determine whether the actual ram position is equivalent to the calculated position YL, taking into account the ram overshoot OC as described earlier. If this condition is not met, indicating that the ram has not yet reached the calculated reversal point to produce the desired bend angle, the value of YL is recalculated. This iterative process continues until the ram position is within the overshoot distance of the calculated ram reversal position, whereupon a signal is produced from processor 15 on output line 8 to reverse the direction of travel of the ram.

The position (YACTF(1)) at which the reversal signal on processor output line 8 was given is stored, and a test made to determine whether the ram has begun to change direction. When the change of direction is sensed, the ram position is stored, indicating the actual point (YACT(2)) at which the ram reversed direction. The point at which the ram was supposed to reverse (YACT(1)), minus the point at which the ram actually did reverse (YACT(2)) equals a new overshoot value (OC). This value OC of ram overshoot is then used in subsequent processing to calculate the reversal point during bending operations of the next workpiece. Thus, the overshoot factor is self-correcting after the initial bend is made.

The main processing of FIG. 7B then continues to raise the ram, and await a subsequent command to perform another bending operation.

Thus, having "taught" the processing of the present invention the parameters necessary to produce particular bend angles for test workpieces of particular thicknesses, the system may then be used to produce accurate bends in any other production workpiece lying within the programmable range of thicknesses and bend angles.

It will be understood that various changes may be made of the details, steps, materials and arrangements of parts, which have been herein described and illustrated in order to explain the invention, within the principle and scope of the invention as expressed in the appended claims.

The embodiments of the invention in which an exclusive property or privilege is claimed are as follows:

1. In a press brake for bending metallic material sheet workpieces to a desired bend angle of the type having a movable forming member and a fixed forming member and an appropriate tooling set comprising a punch affixed to one of said movable forming member and said fixed forming member and a V-die affixed to the other of said forming members for providing the desired bend angle in the workpiece, means for moving said movable forming member toward said fixed forming member and reversing means for moving said movable forming member away from said fixed forming member, means for sensing the position of said movable forming member to produce a signal representative of the position thereof with respect to said fixed forming member, and means for sensing the actual force exerted against the workpiece by said movable member during a bending operation to produce a signal representative thereof, the improvement in combination therewith comprising digital data processing means responsive to said position and force signals, said processing means having a test workpiece teach mode and a production workpiece bend mode, said processing means having memory means, said processing means having means for defining mathematical relationships between material strength, material thickness, movable forming member position and bend angle from in-process measurements during said teach mode, means for storing said relationships in said memory means, and said processing means having means for utilizing in-process measurements of material thickness and material strength during said production workpiece bend more in combination with said stored relationships from said teach more to calculate and determine the precise reversal position at which to activate said reversing means to cause said movable forming member to begin moving away from said fixed forming member in order to compensate for workpiece spring-back so as to produce with said particular punch and die set the desired bend angle in each production workpiece.

2. In a press brake for bending metallic material sheet workpieces to a desired bend angle of the type having a movable forming member and a fixed forming member and an appropriate tooling set comprising a punch affixed to one of said movable forming member and said fixed forming member and a V-die affixed to the other of said forming members for producing the desired bend angle in the workpiece, means for moving said movable forming member toward said fixed forming member and reversing means for moving said forming member away from said fixed forming member, means for sensing the position of said movable forming member to produce a signal representative of the position thereof with respect to said fixed forming member, and means for sensing the actual force exerted against the workpiece by said movable forming member during a bending operation to produce a signal representative thereof, the improvement in combination therewith comprising digital data processing means responsive to said position and force signals for calculating and determining the precise reversal position at which to activate said reversing means to cause said movable forming member to begin moving away from said forming member in order to compensate for workpiece spring-back so as to produce with said particular punch and die set the desired bend angle in production workpieces, said processing means having a test workpiece test mode comprising:

means for storing the measured thickness and the measured bend angle of each test workpiece;

means for storing first sets of data pairs representative of the movable forming member position and force during bending of a plurality of test workpieces;

means for calculating from said first sets of test workpiece data pairs information representative of the loading characteristics of said plurality of test workpieces;

means for storing second sets of data pairs representative of the movable forming member position and forming force associated with said plurality of test workpieces during retraction of the movable forming member following reversal;

means for calculating from said second sets of test workpieces data pairs information representative of the unloading characteristics of said plurality of test workpieces;

means for calculating the position of the top of that one of said punch and die supporting each test workpiece;

means for calculating from said information representative of said loading characteristics and unloading characteristics, said measured thicknesses and said measured bend angles of said test workpieces a first mathematical relationship between material strength, material thickness and bend angle;

means for calculating from said movable member position data, said measured thicknesses and said measured bend angles of said test workpieces a second mathematical relationship between movable member position, material thickness and bend angle;

said processing means having a production workpiece bend mode comprising:

means for storing first sets of data pairs representative of the movable forming member position and force during bending of each subsequent production workpiece utilizing said particular punch and die set;

means for calculating from said first sets of production workpiece data pairs information representative of the loading characteristics of each subsequent production workpiece;

means for calculating, for each subsequent production workpiece, the thickness thereof from said previously calculated punch or die top position; and means for calculating, for each subsequent production workpiece, from said loading characteristics of each production workpiece, from said mathematical relationships and said thickness of each production workpiece, said reversal position for each production workpiece necessary to produce the desired bend angle therein with said particular punch and die set.

3. The apparatus claimed in claim 2 wherein said plurality of test workpieces are divided into groups containing equal numbers of test workpieces, the test workpieces of each group having the same thickness, the test workpieces of each group differing in thickness from the test workpieces of the other groups, each test workpiece within each group is formed to a different bend angle than the other test workpieces in that group, and the test workpieces of said groups are formed to the same bend angles.

4. The apparatus claimed in claim 2 wherein each of said test workpieces is of a different thickness, and each of said test workpieces is sequentially bent to the same series of increasingly acute bend angles.

5. The apparatus claimed in claim 2 including means for calculating a distance value representative of the expected overshoot of said movable forming member and means for correcting said reversal point with said overshoot distance value in order to compensate for the movable forming member overshoot following activation of said reversing means.

6. The apparatus claimed in claim 2 wherein said means for storing said first sets of data pairs representative of the movable forming member position and forming force during bending of said test workpieces and said production workpieces includes means for only storing forming force data greater than a force floor value representative of the unloaded weight of and frictional forces associated with said movable forming member.

7. The apparatus claimed in claim 6 wherein said bending of each test workpiece and each production workpiece defines a force/displacement curve comprising a loading portion and an unloading portion, said loading portion comprising an elastic part and a plastic part extending to said reversal position, said unloading portion comprising the spring-back portion of the force/displacement curve, means for limiting said first sets of test workpiece and production workpiece data pairs for use by said means to calculate the loading characteristics of said test workpieces and said production workpieces to those data pairs stored during a preselected portion of said elastic parts of said test and production workpiece force/displacement curves.

8. Then apparatus claimed in claim 7 including means for limiting said second sets of test workpiece data pairs for use by said means to calculate the unloading characteristics of said test workpieces to those data pairs stored during a preselected portion of said spring-back portions of said test workpiece force/displacement curves.

9. The apparatus claimed in claim 8 including means for calculating the slopes of said preselected portions of said elastic parts of said loading portions of said test workpiece force/displacement curves and means for calculating the slopes of said preselected portions of said spring-back portions of said test workpiece force/displacement curves, said means for calculating said first mathematical relationship utilizing said calculated slopes together with said measured thickness and measured bend angles.

10. The apparatus claimed in claim 9 including means for calculating the slope of said preselected portion of said elastic part of said loading portion of said force/displacement curve for each production workpiece and said means for calculating the slope of said spring-back portion of said force/displacement curve for each production workpiece, said means for calculating said reversal position for each production workpiece utilizing said calculated slopes for that workpiece for which the reversal position is being calculated, together with its thickness and said relationships.

11. The apparatus claimed in claim 10 wherein said movable forming member comprises a ram and said fixed forming member comprises a bed of said press brake.

12. A method of bending a production workpiece to a desired unloaded bend angle during a forming cycle of a press brake provided with a punch and die set comprising:

bending a plurality of test workpieces to one or more desired unloaded angles;

measuring the loading characteristics of said plurality of workpieces during the bending of the test workpieces;

recording ram position data for the punch during the bending of the test workpieces;

measuring the unloading characteristics of said plurality of test workpieces as the test workpieces spring back from a loaded to an unloaded state;

measuring the thickness and bend angle of each test workpiece;

calculating from said loading and unloading characteristics, said measured thicknesses, said measured bend angles and said ram position data of said test workpieces relationships relating to said reversal position necessary to produce a desired bend angle for said punch and die set;

commencing to bend a production workpiece utilizing said punch and die set;

measuring the loading characteristics of said production workpieces during the bending thereof;

calculating the thickness of said production workpiece;

calculating for said production workpiece the reversal position necessary to produce the desired bend angle with said punch and die set utilizing said loading characteristics of said production workpiece, said relationships and said thickness of said production workpiece; and reversing said punch when its position is the same as said calculated reversal position.

13. A method according to claim 12 including measuring said test workpiece and production workpiece loading characteristics only during selected linearlized portions of their elastic and plastic loading curves and measuring the unloading characteristics of said test workpieces only during selected linearlized portions of their unloading curves.

14. In a press brake for bending a metallic material sheet workpiece to a desired bend angle of the type having a frame supporting a bed, a die member mounted on the bed, a ram displaceable with respect to said bed, a punch member mounted on the ram and configured to engage the die to produce the desired bend angle in the workpiece, means for moving the ram toward the bed and reversing means for moving the ram away from the bed, means for sensing the position of the ram to produce a signal representative of actual ram position, and means for sensing the actual force exerted against the workpiece during the bending operation to produce a signal representative of ram force, the improvement in combination therewith comprising digital data processing means responsive to said position and force signals for determining the precise point of punch penetration at which to activate said reversing means to cause ram reversal in order to compensate for workpiece springback so as to produce the desired bend angle in a production workpiece, said processor means including memory means and having a stored computer program resident in said memory means including:

(a) a teach mode executing the steps of:
(i) collecting ram force and ram position data during the bending of a plurality of test workpieces;
(ii) measuring the thickness and bend angle of each test workpiece;
(iii) calculating from said ram force and ram position data and said thickness and bend angle measurements relationships relating to the ram reversal position necessary to produce a desired bend angle;
(iv) calculating the position of the top of said die; and
(v) storing said calculated relationships and said die top position in said memory means;

(b) and a bend mode for bending a production workpiece to a desired angle executing the steps of:
(i) collecting production ram force and ram position data during bending of said production workpiece;
(ii) recalling said die top position from said memory;
(iii) calculating the thickness of said production workpiece utilizing said die top position;
(iv) recalling said calculated relationships from said memory means;
(v) calculating from said recalled relationships, said production workpiece force and position data and said workpiece thickness the position of ram reversal necessary to produce the desired bend angle in the production workpiece;
(vi) repeating step (b)(v) if the ram position has not reached said calculated position of ram reversal; and
(vii) activating said ram reversal means to reverse the ram if the ram position has reached said calculated point of ram reversal.

15. The apparatus according to claim 14 wherein said computer program further executes the step of correcting the position of ram reversal for ram overshoot during the bend mode.

* * * * *

UNITED STATES PATENT AND TRADEMARK OFFICE
CERTIFICATE OF CORRECTION

PATENT NO. : 4,819,467
DATED : April 11, 1989
INVENTOR(S) : Raymond J. Graf and Scott D. Tucker It is certified that error appears in the above-identified patent and that said Letters Patent is hereby corrected as shown below:

In the claims:

Claim 1 - Column 12 - Line 12:
the word "providing" should read "producing"

Claim 1 - Column 12 - Line 36:
the word "more" should read "mode"

Claim 1 - Column 12 - Line 37:
the word "more" should read "mode"

Claim 2 - Column 12 - Line 54:
the word "movable" should be inserted before the
    word "forming"

Claim 2 - Column 12 - Line 67:
the word "fixed" should be inserted before the
    word "forming"

Signed and Sealed this

Fifteenth Day of January, 1991

Attest:

HARRY F. MANBECK, JR.

*Attesting Officer*     *Commissioner of Patents and Trademarks*